(12) United States Patent
Shibata et al.

(10) Patent No.: US 11,649,871 B2
(45) Date of Patent: *May 16, 2023

(54) CYLINDER DEVICE AND METHOD FOR MANUFACTURING CYLINDER DEVICE

(71) Applicant: KYB CORPORATION, Tokyo (JP)

(72) Inventors: Yoshihiro Shibata, Tokyo (JP); Yasuhiro Inagaki, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,628

(22) Filed: Mar. 8, 2022

(65) Prior Publication Data

US 2022/0213944 A1    Jul. 7, 2022

Related U.S. Application Data

(63) Continuation of application No. 16/309,008, filed as application No. PCT/JP2017/027704 on Jul. 31, 2017, now Pat. No. 11,300,173.

(30) Foreign Application Priority Data

Aug. 9, 2016 (JP) .............................. JP2016-156496

(51) Int. Cl.
*F16F 9/32* (2006.01)
*B60G 13/00* (2006.01)
(Continued)

(52) U.S. Cl.
CPC .......... *F16F 9/3235* (2013.01); *B60G 13/005* (2013.01); *F16F 9/32* (2013.01);
(Continued)

(58) Field of Classification Search
USPC ...................... 188/321.11, 322.19; 267/195; 280/124.154; 248/300
See application file for complete search history.

(56) References Cited

U.S. PATENT DOCUMENTS 5,282,645 A    2/1994  Spakowski et al.
5,603,392 A    2/1997  Beck
(Continued)

FOREIGN PATENT DOCUMENTS

DE    19647411 C1    3/1998
EP    1505313 A2     2/2005
(Continued)

OTHER PUBLICATIONS

Dec. 8, 2020, Japanese Office Action issued for related JP application No. 2016-156496.
Aug. 3, 2020, Chinese Office Action issued for related CN application No. 201780048114.5.
Apr. 21, 2020, Japanese Office Action issued for related JP Application No. 2016-156496.
(Continued)

*Primary Examiner* — Christopher P Schwartz
(74) *Attorney, Agent, or Firm* — Paratus Law Group, PLLC (57) ABSTRACT

A bracket of a cylinder device includes: a tubular portion having a C-shaped cross section, holding an outer periphery of the outer shell, and having a slit in a front portion; and a pair of mounting portions and protruding outward in the radial direction from both ends of the tubular portion in the circumferential direction. The tubular portion includes a hole formed to permit insertion of the protrusion, from at least one side portion to the back portion of the tubular portion.

5 Claims, 7 Drawing Sheets

(51) Int. Cl.
*F16F 9/54* (2006.01)
*B23K 101/00* (2006.01)
*B60G 13/08* (2006.01)

(52) U.S. Cl.
CPC .......... *F16F 9/54* (2013.01); *B23K 2101/006* (2018.08); *B60G 13/08* (2013.01); *B60G 2204/129* (2013.01); *B60G 2206/41* (2013.01); *B60G 2206/8201* (2013.01); *F16F 2226/048* (2013.01)

(56) References Cited

U.S. PATENT DOCUMENTS

| | | | |
|---|---|---|---|
| 5,772,168 | A | 6/1998 | Nakazawa et al. |
| 9,662,948 | B2 | 5/2017 | Asaoka et al. |
| 11,300,173 | B2 * | 4/2022 | Shibata ................... F16F 9/32 |
| 2002/0125382 | A1 | 9/2002 | Fullenkamp et al. |
| 2007/0278726 | A1 | 12/2007 | Nagasawa et al. |
| 2016/0059663 | A1 | 3/2016 | Teraoka et al. |
| 2016/0230832 | A1 | 8/2016 | Hagidaira |

FOREIGN PATENT DOCUMENTS

| | | |
|---|---|---|
| JP | 2007-320332 A | 12/2007 |
| JP | 2009-216129 A | 9/2009 |
| JP | 2015-059574 A | 3/2015 |
| JP | 2015-197129 A | 11/2015 |

OTHER PUBLICATIONS

Jan. 20, 2020, Chinese Office Action issued for related CN Application No. 201780048114.5.
Apr. 15, 2020, European Search Report issued for related EP Application No. 17839268.4.
Feb. 2, 2021, Chinese Office Action issued for related CN Application No. 201780048114.5.
Jan. 11, 2022, Japanese Office Action issued for related JP Application No. 2021-034939.
Dec. 2, 2021, Japanese Notice of Opposition Number issued for related JP Patent No. 6882866.
Dec. 2, 2021, Japanese Opposition issued for related JP Patent No. 6882866.

* cited by examiner

\<AT WELDING OF PROTRUSION\>

FIG. 7B

CYLINDER DEVICE AND METHOD FOR MANUFACTURING CYLINDER DEVICE

CROSS REFERENCE TO PRIOR APPLICATION

This application is a continuation of U.S. patent application Ser. No. 16/309,008 (filed on Dec. 11, 2018), which is a National Stage Patent Application of PCT International Patent Application No. PCT/JP2017/027704 (filed on Jul. 31, 2017) under 35 U.S.C. § 371, which claims priority to Japanese Patent Application No. 2016-156496 (filed on Aug. 9, 2016), which are all hereby incorporated by reference in their entirety.

TECHNICAL FIELD

The present invention relates to a cylinder device and a method for manufacturing a cylinder device.

BACKGROUND ART

As disclosed in JP 2015-56574 A, a certain conventional cylinder device functions as a damper while being provided with a damping force variable valve attached to a side portion of an outer shell. The damper uses the damping force variable valve to adjust the resistance applied to the flow of the hydraulic fluid generated when the damper is expanded or compressed, enabling adjustment of levels of the damping force generated by the damper. Furthermore, the damping force variable valve can be provided at a side portion of the outer shell so as to protrude outward in a radial direction, so that the axial length of the damper is able to be reduced without sacrificing the stroke length of the damper. Therefore, this type of cylinder device can enhance mountability.

Some of the cylinder devices are used in strut suspensions, specifically used as struts for positioning wheels by being joined to knuckles via brackets welded and fixed to an outer periphery of a lower end portion of the outer shell. In a case where the cylinder device having the bracket includes a protrusion such as the damping force variable valve as described above, the protrusion might be disposed at a portion covered with the bracket in some cases. In that case, as disclosed in JP 2015-197129 A, a hole permitting insertion of the protrusion is provided in the bracket, and the protrusion is welded to the side portion of the outer shell exposed by the hole.

SUMMARY OF THE INVENTION

A bracket of a cylinder device used in a strut suspension disclosed in JP 2015-197129 A includes a tubular portion having a C-shaped cross section and holding an outer periphery of an outer shell, and a pair of mounting portions extending in parallel from both ends of the tubular portion in a circumferential direction outward in a radial direction. In addition, the bracket is fixed in a state where a knuckle arm is sandwiched between the pair of mounting portions.

In such a tubular portion of the bracket, when a portion in which the pair of mounting portions is continuous is defined as a front portion and each of a left portion and a right portion in a state where the front portion is directed to the front and an axis passing through the center of the tubular portion is arranged to extend in the vertical direction is defined as a side portion, it is preferable, as illustrated in FIG. 2 of JP 2015-197129 A, to allow a protrusion to be welded to the outer shell to protrude outward from the side portion of the tubular portion in order to avoid interference between the protrusion and the peripheral components in a mounting state onto a vehicle.

However, in a state where the protrusion protrudes outward from the side portion of the tubular portion, it would be difficult to weld even though the hole for inserting the protrusion is enlarged. The reason is that a mounting portion is connected to the front portion of the tubular portion to reduce the distance between the protrusion and the mounting portion, and thus, the mounting portion would hinder welding operation. Therefore, in the case of performing automatically welding the outer shell on which the bracket is mounted on the outer periphery and the protrusion being set in a welding machine, there would be a need to avoid interference between the components of the machine such as a torch or an arm to drive the torch and the mounting portion, leading to a possibility of having a large-scaled welding machine to increase the cost or giving up automatic welding by the machine.

The present invention aims to provide a cylinder device capable of easily welding a protrusion to an outer shell and allowing the protrusion to protrude outward from a side portion of the tubular portion in a state where the bracket is fixed to the outer shell by welding or the like, and a method for manufacturing a cylinder device.

The cylinder device according to the present invention includes: a tubular portion having a C-shaped cross section with a bracket holding the outer periphery of the outer shell and having a slit in a front portion; and a pair of mounting portions protruding outward in the radial direction from both ends of the tubular portion in a circumferential direction, in which the tubular portion includes a hole formed to permit insertion of the protrusion portion, from at least one side portion to the back portion of the tubular portion.

DESCRIPTION OF EMBODIMENTS

Hereinafter, an embodiment of the present invention will be described with reference to the drawings. Same reference numerals assigned throughout the several views indicate same components.

Figure 1:
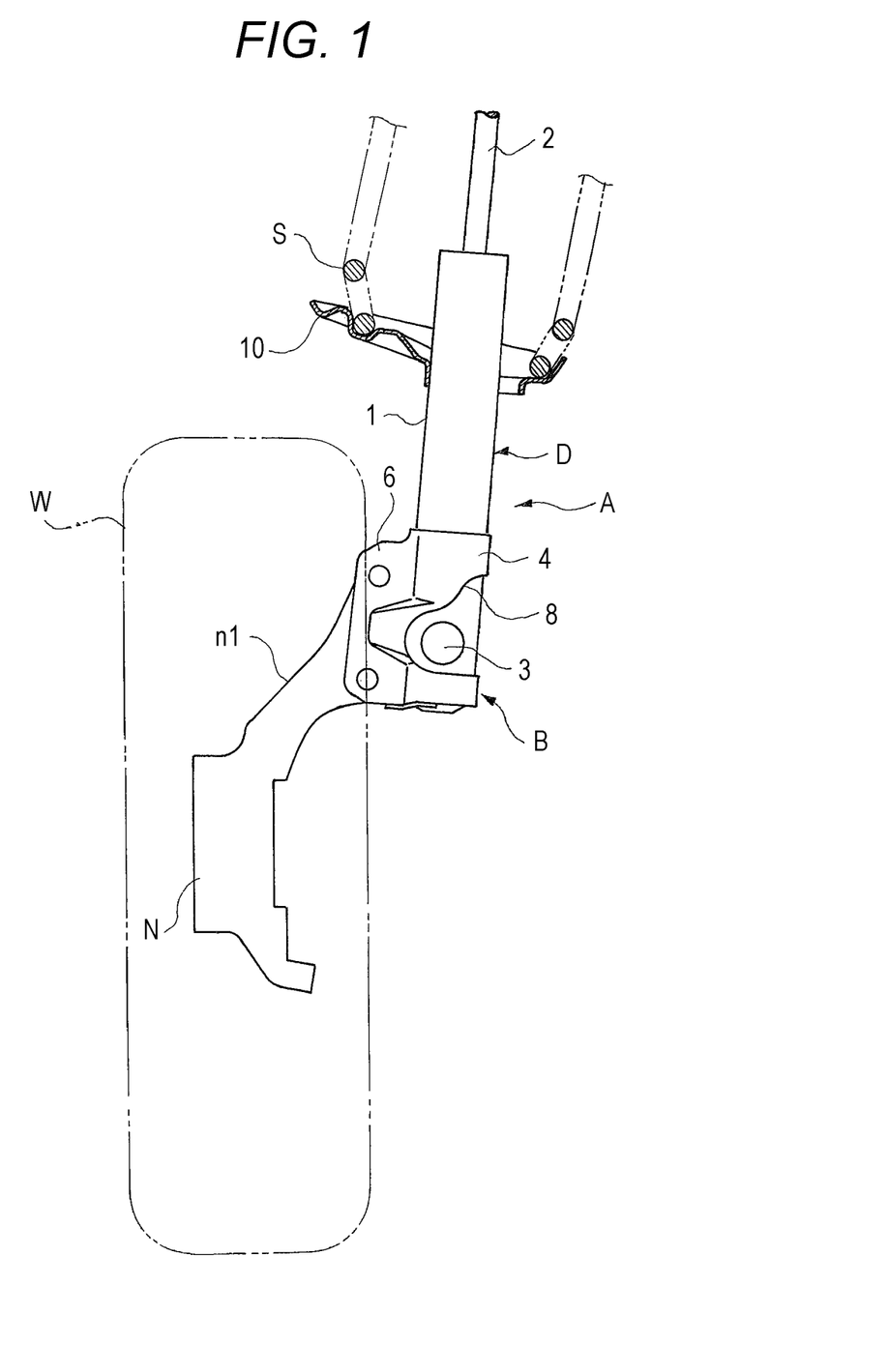
FIG. 1 is a mounting diagram illustrating a mounting state of a damper as a cylinder device according to an embodiment of the present invention.

As illustrated in FIG. 1, a cylinder device according to an embodiment of the present invention is implemented as a damper A used for a strut suspension, and is used for a vehicle such as a four-wheeled automobile. The damper A includes a main body D having an outer shell 1 and a rod 2 to be inserted into the outer shell 1, a vehicle body-side mount (not illustrated) that joins the rod 2 to the vehicle body, a bracket B that joins the outer shell 1 to a wheel W, a spring receiver (not illustrated) to be attached to the vehicle body-side mount, a dish-shaped spring receiver 10 attached to an outer periphery of the outer shell 1, and a suspension spring S interposed between the two spring receivers.

More specifically, the wheel W is rotatably supported by a knuckle N, and the bracket B is fixed to a knuckle arm n1 provided on the knuckle N and extending diagonally upward in FIG. 1 with a bolt. The main body D functions as a strut for positioning the wheel W. When the wheel W moves up and down with respect to the vehicle body when the vehicle travels on a road surface with irregularities, for example, the rod 2 goes in or out from the outer shell 1 to cause expansion or compression of the main body D. At the same time, the spring receiver moves to be farther or closer to cause expansion or compression of the suspension spring S, leading to expansion or compression of the damper A.

The suspension spring S is a coil spring and is provided on the outer periphery of the main body D. The suspension spring S exerts an elastic force when it is compressed. The greater the compression amount of the suspension spring S, the greater the elastic force. The vehicle body is elastically supported by the suspension spring S. The configuration of the suspension spring S can be appropriately changed. For example, the suspension spring S may be a spring other than a coil spring, such as an air spring.

Figure 2:
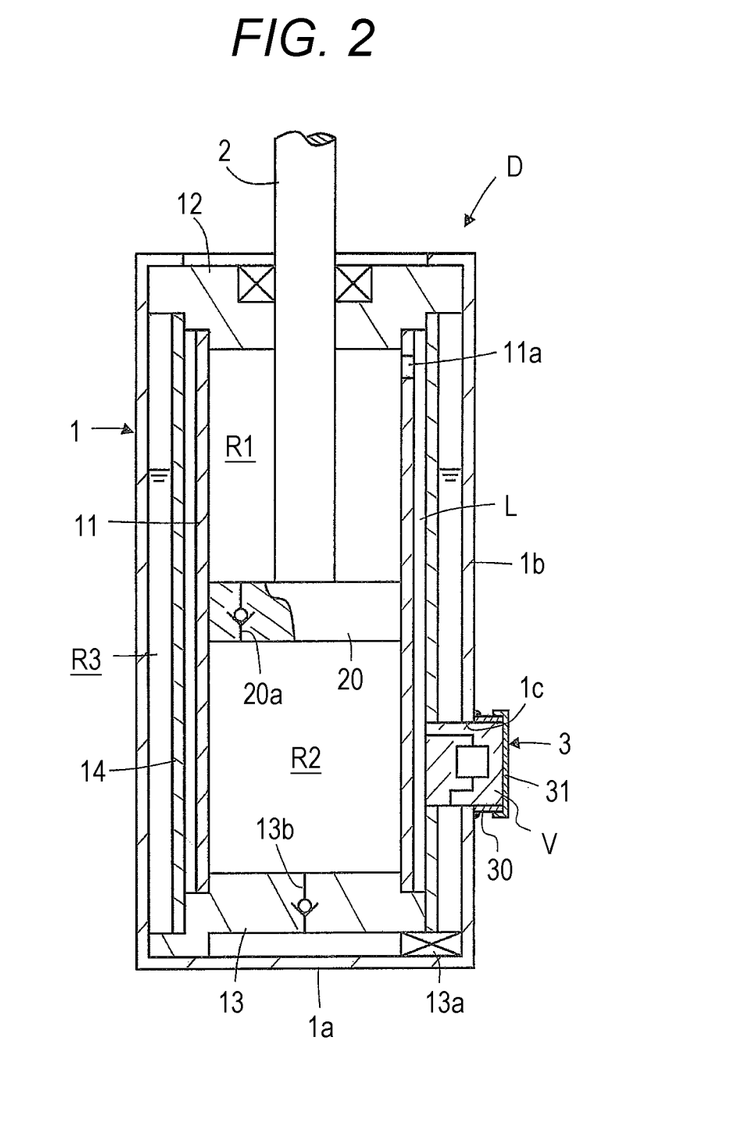
FIG. 2 is a vertical cross-sectional view schematically illustrating a vertical cross section of a main body of a damper as a cylinder device according to an embodiment of the present invention.

As described above, the main body D includes the outer shell 1 and the rod 2, and as illustrated in FIG. 2, and further includes a cylinder 11, a piston 20 slidably inserted in the cylinder 11, an annular rod guide 12 fixed to an upper end portion of the cylinder 11, a bottom member 13 fixed to a lower end portion of the cylinder 11, and a middle pipe 14 provided on an outer periphery of the cylinder 11. The cylinder 11 and the middle pipe 14 are disposed inside the outer shell 1, constituting a triple pipe with these three parts. The rod 2 has a lower end joined to the piston 20 in FIG. 2, and has its upper side protruding outward from the outer shell 1 while being supported by the rod guide 12.

As illustrated in FIG. 2, the outer shell 1 has a bottomed tubular shape and includes a bottom cap 1a as a bottom portion and a tubular portion 1b extending upward from an outer peripheral portion of the bottom cap 1a. In addition, an upper end opening portion of the tubular portion 1b is closed with the rod guide 12 to seal the space formed inside the outer shell 1. An attachment hole 1c penetrating through a wall thickness of the tubular portion 1b is formed on a side portion of the outer shell 1. A damping force variable valve V to be described below is attached to the attachment hole 1c in a state where its leading end is inserted.

The interior of the cylinder 11 is partitioned into two chambers, namely, an extension side chamber R1 and a compression side chamber R2 by a piston 20, and each of the chambers is filled with a liquid such as hydraulic oil. The chamber formed on the rod 2 side of the piston 20 is the extension side chamber R1 and the opposite side is the compression side chamber R2. The rod 2 penetrates through the center portion of the extension side chamber R1. The piston 20 includes a piston passage 20a formed to permit a liquid flow from the compression side chamber R2 to the extension side chamber R1 alone.

On the outer periphery of the cylinder 11, a tubular discharge passage L is formed between the cylinder 11 and the middle pipe 14 while a tubular liquid reservoir chamber R3 is formed between the middle pipe 14 and the outer shell 1. The liquid reservoir chamber R3 is filled with the liquid and a gas. A through hole 11a is formed in the cylinder 11 at a position facing the extension side chamber R1. The discharge passage L allows communication between the extension side chamber R1 and the liquid reservoir chamber R3 via the through hole 11a. The damping force variable valve V is provided in the discharge passage L. This damping force variable valve V can apply resistance to the flow of the liquid in the discharge passage L and adjust the resistance.

The bottom member 13 includes: a notch 13a for guiding the liquid in the liquid reservoir chamber R3 to a position between the bottom member 13 and the bottom cap 1a; and a suction passage 13b that permits a liquid flow from the liquid reservoir chamber R3 toward the compression side chamber R2 alone.

According to the above configuration, in a case where the rod 2 retracts from the outer shell 1 and the damper A extends, the piston 20 moves upward in the cylinder 11 in FIG. 2, the extension side chamber R1 is reduced while the compression side chamber R2 is expanded. The liquid in the extension side chamber R1, which is reduced when the damper A is extended, passes through the through hole 11a and the discharge passage L and flows out to the liquid reservoir chamber R3. Since the resistance is applied by the damping force variable valve V to the flow of the liquid, the pressure in the extension side chamber R1 increases when the damper A is extended, and the extension operation of the damper A is suppressed. In this manner, the damper A exerts the extension side damping force that suppresses extension operation. A liquid in the liquid reservoir chamber R3 is supplied to the expanding compression side chamber R2 through the notch 13a and the suction passage 13b.

Conversely, when the rod 2 enters the outer shell 1 to compress the damper A, the piston 20 moves downward in the cylinder 11 in FIG. 2, the compression side chamber R2 is reduced, and the extension side chamber R1 expands. The liquid in the compression side chamber R2, which is reduced at compression of the damper A, moves to the expanding extension side chamber R1 through the piston passage 20a. Furthermore, the liquid corresponding to two volumes of the rod entering into the cylinder 11 becomes excessive in the cylinder 11 when the damper A is compressed, and thus, this excess liquid passes through the through hole 11a and the discharge passage L to flow out to the liquid reservoir chamber R3. Since the resistance is applied by the damping force variable valve V to the flow of the liquid, the pressure inside the cylinder 11 rises when the damper A is compressed, suppressing the compression operation of the damper A. In this manner, the damper A exerts the compression side damping force that suppresses compression operation.

That is, the damper A has a configuration in which the middle pipe 14 and the outer shell 1 constitute a reservoir including the liquid reservoir chamber R3, enabling compensation of a cylinder internal volume change corresponding to the rod volume entering and leaving the cylinder 11 by using the reservoir or compensation for the volume change of the liquid due to the temperature change.

In addition, the damper A is set to the use of uniflow operation. When the damper A moves in expansion and compression operation, the liquid circulates through the three chambers of the extension side chamber R1, the liquid reservoir chamber R3 (reservoir), and the compression side chamber R2 in this order in one-way flow while the liquid is set to surely flow through the discharge passage L from the extension side chamber R1 toward the liquid reservoir chamber R3 (reservoir). Therefore, the single damping force variable valve V provided in the middle of the discharge passage L can exert the damping force on both the extension/ compression sides, and can adjust the resistance to be applied to the flow of the liquid so as to adjust the level of the damping force on both the extension and compression sides.

While the damping force variable valve V may have any configuration, the damping force variable valve V typically includes: a valve seat member including a passage formed to connect to the discharge passage L; a main valve to be separated or seated on the valve seat member to open or close the passage; a pilot passage for reducing the pressure on the upstream side of the main valve to lead the liquid to the back surface of the main valve; and a pilot valve provided in the middle of the pilot passage to control the back pressure of the main valve. In a case where the pilot valve is a solenoid valve, it is possible to adjust the amount of current flowing to the pilot valve to increase or decrease the valve opening pressure of the pilot valve, making it possible to increase or decrease the valve opening pressure of the main valve to adjust the level of the damping force.

The damping force variable valve V is housed in a case, and the case includes: a tubular sleeve 30 to be welded to an edge portion of the attachment hole 1c formed in the side portion of the outer shell 1; and a cap 31 for closing the opening of the sleeve 30. Accordingly, when the sleeve 30 is welded to the outer shell 1 and then the damping force variable valve V is housed in the sleeve 30, the damping force variable valve V can be fixed in a state of being protruding outward in the radial direction on the side portion of the outer shell 1. In this manner, the damper A defines a case portion that houses the damping force variable valve V to be a protrusion 3 that protrudes outward in the radial direction on the side portion of the outer shell 1. The bracket B for joining the outer shell 1 to the knuckle N to be attached includes a hole 8 in order to avoid interference with the protrusion 3 (FIG. 1).

Figure 3:
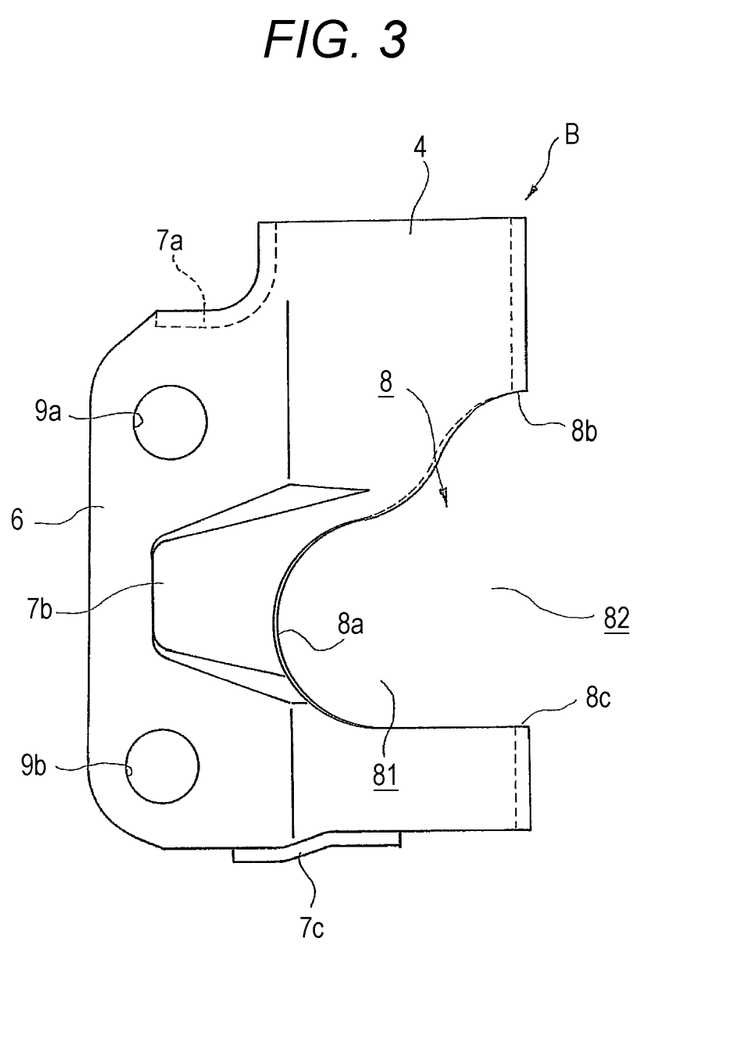
FIG. 3 is a right side view illustrating a bracket of a damper as a cylinder device according to an embodiment of the present invention.
Figure 4:
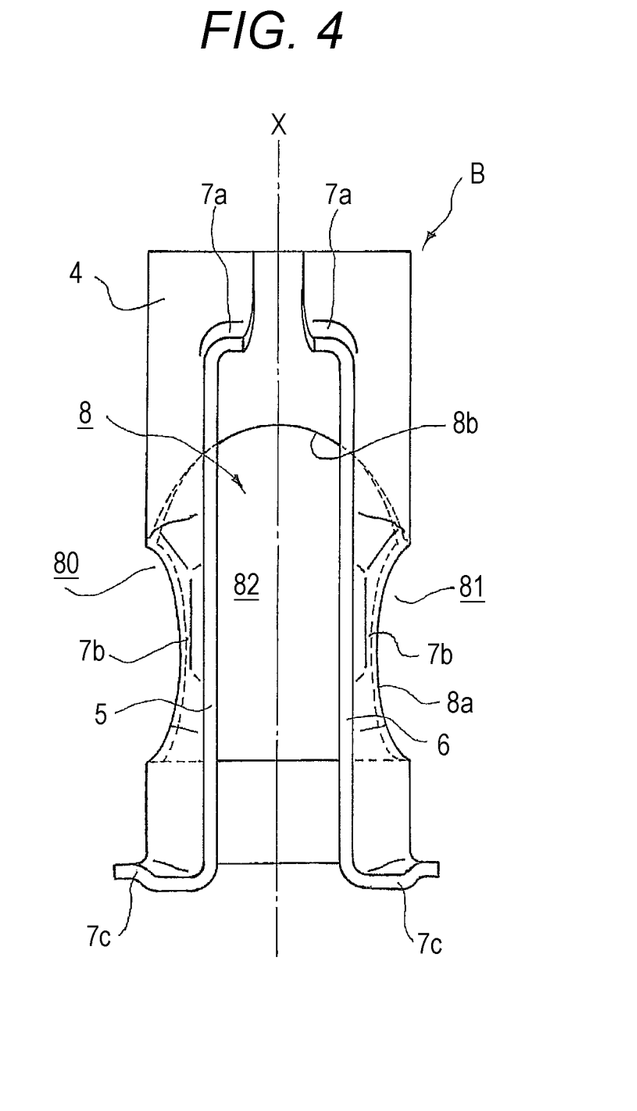
FIG. 4 is a front view illustrating a bracket of a damper as a cylinder device according to an embodiment of the present invention.
Figure 5:
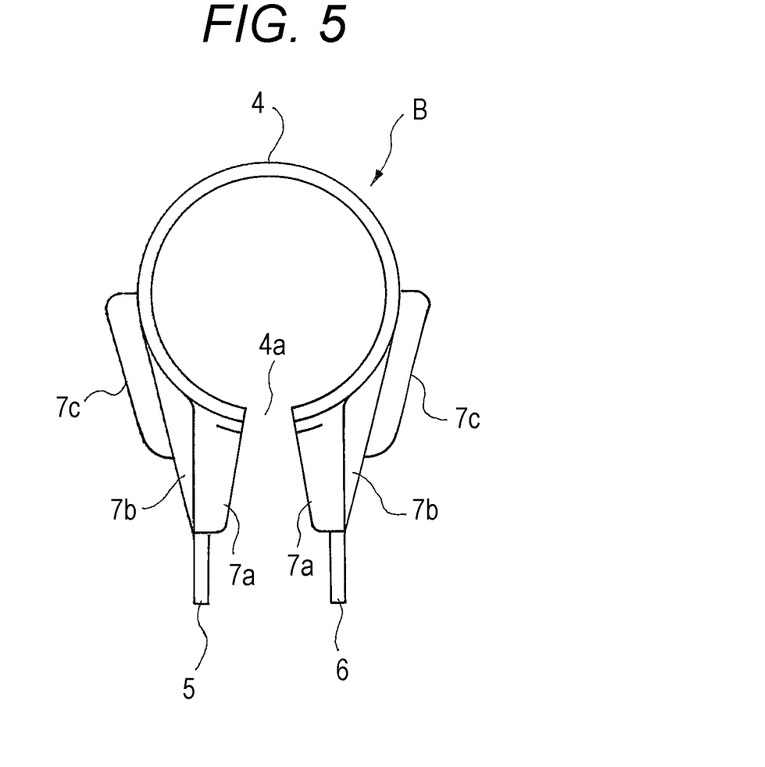
FIG. 5 is a plan view illustrating a bracket of a damper as a cylinder device according to an embodiment of the present invention.

More specifically, as illustrated in FIGS. 3-5, the bracket B includes: a tubular portion 4 having a C-shaped cross section and being curved so as to follow the outer peripheral surface of the outer shell 1 and covering the outer periphery of the outer shell 1; a pair of plate-like mounting portions 5 and 6 extending outward in the radial direction from both ends in the circumferential direction of the tubular portion 4; and reinforcing ribs 7a, 7b, and 7c. As illustrated in FIGS. 3 and 4, the hole 8 is formed from both side portions to the back portion of the tubular portion 4.

In the description and claims of the present application, a portion to which the pair of mounting portions 5 and 6 is attached is a front portion of the bracket B and the tubular portion 4, their opposite side is a back portion, and left and right portions in a state where the pair of mounting portions 5 and 6 (front portions) faces the front and an axis X passing through the center of the tubular portion 4 extends in the vertical direction are defined as left and right side portions, as illustrated in FIG. 4.

FIG. 3 is a right side view illustrating a state in which the right side portion of the bracket B faces the front. FIG. 4 is a front view illustrating a state in which the front portion of the bracket faces the front. FIG. 5 is a plan view illustrating a state in which the bracket of FIG. 4 is viewed from above. Furthermore, in the front view illustrated in FIG. 4, the bracket B is line-symmetrical with respect to the axis X passing through the center of the tubular portion 4, and the left side surface of the bracket B is symmetrical with the right side surface in FIG. 3. Hereinafter, for convenience of description, the upper, lower, left, right, front, and back of the bracket B illustrated in FIG. 4 will be simply referred to as "upper", "lower", "left", "right", "front" and "back", unless otherwise specified.

A slit 4a (FIG. 5) is formed in the front portion of the tubular portion 4 along the axial direction, and the cross section when the tubular portion 4 is cut in the radial direction is C-shaped in all portions in the axial direction. The left and right mounting portions 5 and 6 extend from both ends of the tubular portion 4 in the circumferential direction toward the front side while maintaining a certain interval therebetween, being arranged to face each other. All of the ribs 7a, 7b, and 7c are provided from the tubular portion 4 toward one of the mounting portions (5 or 6), being formed at an upper portion of the bracket B, a center portion in the axial direction (vertical direction), and the lower end. Note that the positions and shapes of the ribs 7a, 7b, and 7c are not limited to the illustrated positions as long as the rigidity of the bracket B can be ensured.

In addition, in each of the left and right mounting portions 5 and 6, insertion holes 9a and 9b through which bolts can be inserted are formed at upper and lower portions (FIG. 3). In addition, the knuckle arm n1 (FIG. 1) is inserted between the pair of mounting portions 5 and 6. A bolt is inserted from the insertion hole 9a on the upper side of one mounting portion to the insertion hole 9a on the upper side of the other mounting portion. Then, a bolt is inserted from the insertion hole 9b on the lower side of one mounting portion to the insertion hole 9b on the lower side of the other mounting portion. Subsequently, nuts are individually screwed to the upper and lower bolts and the nuts are tightened to join the bracket B to the knuckle N.

Figure 6:
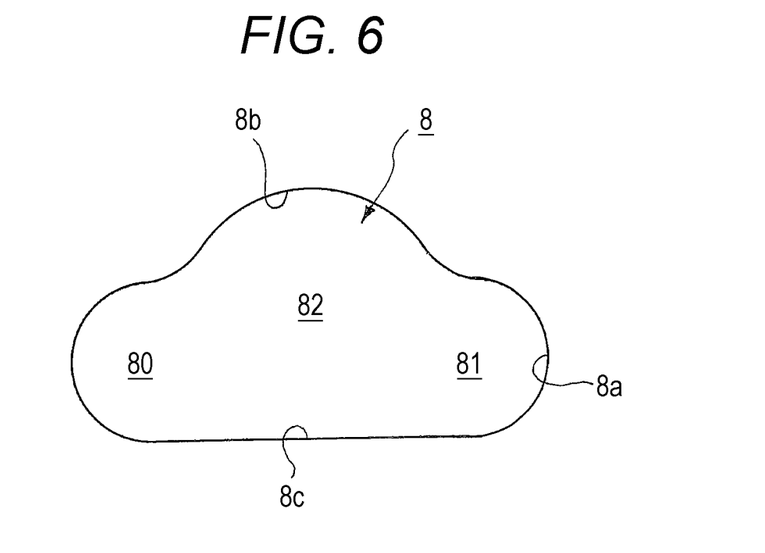
FIG. 6 is a front view illustrating a hole when a bracket of a damper as a cylinder device according to an embodiment of the present invention is expanded.

As described above, the tubular portion 4 includes the hole 8 formed from the left and right side portions to the back portion of the tubular portion 4. FIG. 6 illustrates the shape of the hole 8 in a state where the bracket B is expanded. In the hole 8, portions formed on the left and right sides of the tubular portion 4 are defined as side openings 80 and 81, and a portion formed in the back portion of the tubular portion 4 is defined as a back opening 82.

The shape of the hole 8 is also symmetrical in accordance with the symmetrical shape of the bracket B as described above. Therefore, the right side opening 81 will be described as a representative of the left and right side openings 80 and 81. In a state where the bracket B is welded to the outer periphery of the outer shell 1, the side opening 81 prevents the bracket B and the protrusion 3 from interfering with each other while permitting the protrusion 3 to protrude outward from the side portion of the tubular portion 4. An edge 8a of the side opening 81 is curved in an arc shape so as to bulge toward the front portion side (FIG. 3). Therefore, it is easy to ensure the rigidity of the bracket B while the interference between the edge of the hole 8 and the protrusion 3 is avoided in a state where the protrusion 3 protrudes from the side portion of the tubular portion 4.

Moreover, in a state where the outer shell 1 is inserted to the tubular portion 4, the back opening 82 prevents the bracket B and the protrusion 3 from interfering with each other while permitting the protrusion 3 to protrude outward from the back portion of the tubular portion 4. The axial length of the back opening 82 is longer than the axial length of the side opening 80 and 81, and an upper side edge 8b of the back opening 82 is curved in an arc shape so as to bulge upwardly (FIGS. 3 and 4). Therefore, it is easy to ensure the rigidity of the bracket B while the distance from the protrusion 3 to the edge of the hole 8 is extended in a state where the protrusion 3 protrudes from the back portion of the tubular portion 4.

Hereinafter, a method for manufacturing the damper A which is the cylinder device according to the present embodiment will be described.

First, the outer shell 1 before the protrusion 3 is provided is inserted into the tubular portion 4 of the bracket B. Subsequently, the sleeve 30 is welded to the outer shell 1 while the sleeve 30 (FIG. 2) is pressed against the side portion of the outer shell 1 exposed from the back opening 82. Through this step, the protrusion 3 protruding outward in the radial direction is provided on the side portion of the outer shell 1. As illustrated in portions (a) and (b) of FIG. 7A, the protrusion 3 protrudes outward from the back portion of the bracket B through the back opening 82 in this step. The attachment hole 1c (FIG. 2) may be formed before or after welding of the sleeve 30.

Subsequently, as illustrated in portions (c), (d), and (e) of FIG. 7B, the bracket B is shifted in the axial direction of the outer shell 1 (arrow Y1) and rotated in the circumferential direction (arrow Y2) so as to move the protrusion 3 to the side opening 81. In this manner, the tubular portion 4 is welded to the outer shell 1 in a state where the protrusion 3 provided on the side portion of the outer shell 1 in the previous step protrudes outward from the side portion of the bracket B through the side opening 81.

That is, the damper A is manufactured through two welding steps, namely, a protrusion welding step of providing the protrusion 3 on the outer shell 1 and a bracket welding step of welding the bracket B to the outer shell 1. Additionally, a bracket position changing step of changing the position of the bracket B comes between the two welding steps.

Therefore, although the bracket B is finally fixed to the outer shell 1 in a state where the protrusion 3 protrudes outward from the side portion of the tubular portion 4, it is possible to allow the protrusion 3 to protrude outward from the back portion of the tubular portion 4 in the protrusion welding step. In such a state, the protrusion 3 is distanced from the edge of the hole 8. Therefore, it is easy to avoid interference between the torch and the edge of the hole 8.

Figure 7A:
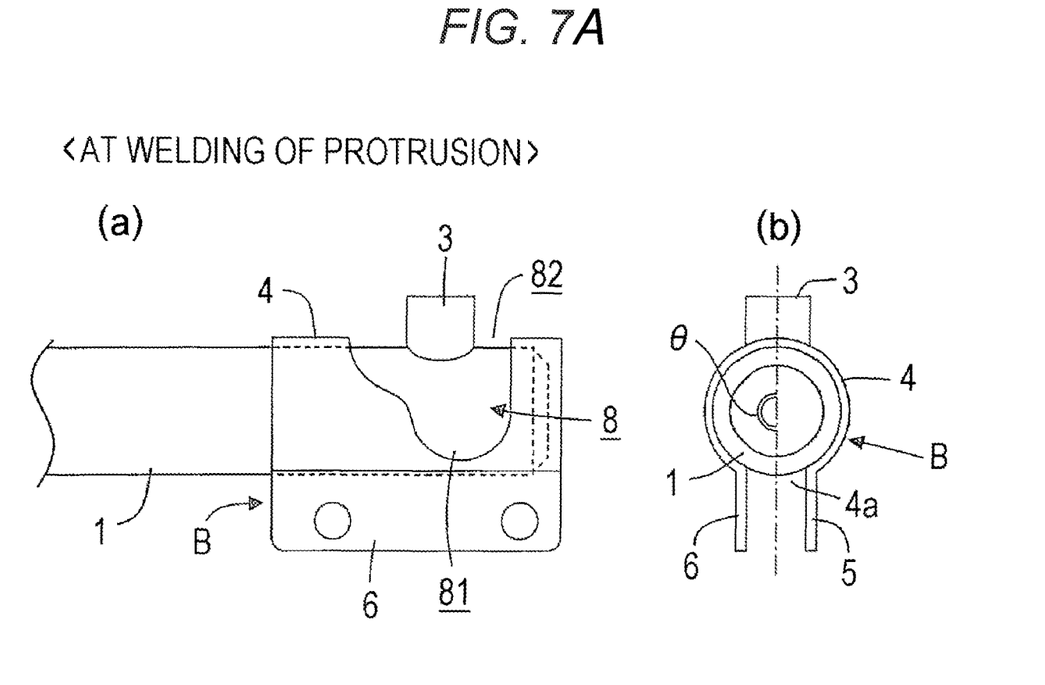
FIG. 7A is a diagram illustrating a state of the damper (cylinder device according to one embodiment of the present invention) during welding of the protrusion and a view of the damper as viewed from the right. In the illustration, the bracket is illustrated in a simplified manner.

Furthermore, in a state where the protrusion 3 protrudes outward from the side portion of the tubular portion 4, the pair of mounting portions 5 and 6 positioned at the front portion of the tubular portion 4 protrudes to the side opposite to the protrusion 3 (portions (a) and (b) of FIG. 7A). Therefore, even if the torch is moved at the time of welding or the outer shell 1 is swung to keep the angle of the torch relative to the outer shell 1 constant, the mounting portions 5 and 6 would not interfere with welding.

Therefore, the protrusion welding step can ensure a sufficient working space of the torch and thus facilitates welding of the protrusion. Accordingly, an angle of the torch with respect to the outer shell 1 can be easily maintained at a predetermined angle, making it possible to enhance the welding accuracy.

In the protrusion welding step, the slit 4a of the tubular portion 4 faces the opposite side of the protrusion 3, and thus, the outer peripheral surface of the outer shell 1 is exposed from the slit 4a (portion (b) of FIG. 7A). Therefore, in the outer shell 1 in the protrusion welding step, it is possible to directly support a portion located on the side opposite to the protrusion 3 in the diametrical direction by using a supporting tool or the like. With this arrangement, the axis of the outer shell 1 can be grasped accurately, making it possible to perform welding with high accuracy such that the axis passing through the center of the protrusion 3 is orthogonal to the axis passing through the center of the outer shell 1.

Figure 7B:
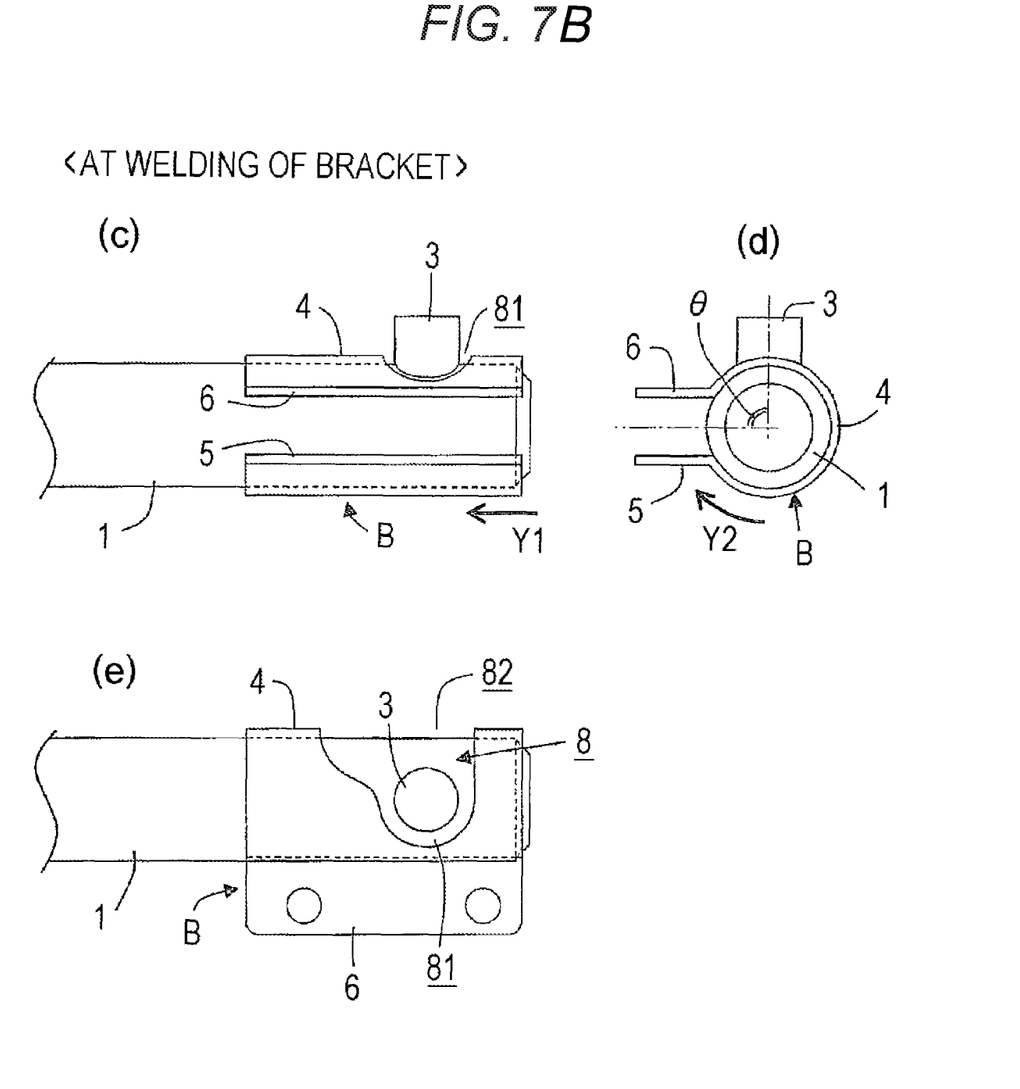
FIG. 7B is a diagram illustrating a state of a damper (cylinder device according to one embodiment of the present invention) during bracket welding, a right side view of the damper, and a top view of the damper. In the illustration, the bracket is illustrated in a simplified manner.

Since the protrusion welding step, the bracket position changing step, and the bracket welding step are performed in this order, the protrusion 3 can be positioned so as to protrude outward from the side portion of the tubular portion 4 (portions (c), (d), and (e) of FIG. 7B) in a state where the bracket B is welded to the outer shell 1. With this configuration, as illustrated in FIG. 1, the front portion of the bracket B faces the wheel W side in a state where the damper A is mounted on the vehicle, and the protrusion 3 protrudes forward or rearward of the vehicle. Therefore, it is possible to avoid the interference of the protrusion 3 with peripheral components in the vehicle.

For example, although not illustrated, in a case where the stabilizer bracket is welded and fixed to the outer periphery of the outer shell 1 and the arm portion of the stabilizer is joined to the stabilizer bracket, the space on the back portion side of the bracket B (right side in FIG. 1) is a space to be used for movement of the arm portion. In such a case, when the protrusion 3 is provided as described above, it is possible to avoid interference between the protrusion 3 and the arm portion without changing the layout of the vehicle.

In the damper A, the protrusion 3 is in a state of being inserted through the right side opening 81 in a state where the bracket B is welded to the outer shell 1. In a case, however, where the bracket B is to be used for a damper attached to a wheel to be in a pair with the wheel W on the left and right, the protrusion 3 is to be inserted through the left side opening 80 while the bracket B is welded to the outer shell 1. With this arrangement, the protrusion of the protrusion 3 can be made in the same direction while the common bracket B is utilized in the mounting state of the pair of dampers on the left and right.

In addition, the protrusion 3 is constituted by the sleeve 30 alone at the stage where the bracket welding step is completed (FIG. 2). After completion of the bracket welding step, the next step to be performed is a main body assembling step of assembling the cylinder 11, the middle pipe 14, the rod 2, the piston 20, the bottom member 13, or the like, onto the outer shell 1. In the main body assembling step, the damping force variable valve V is housed into the sleeve 30, and the cap 31 is attached. Note that, the damping force variable valve V and the cap 31 can be attached to the sleeve 30 at any time after the sleeve 30 has been welded.

Hereinafter, functional effects of the damper A as a cylinder device according to the present embodiment will be described.

The damper A is manufactured using: a protrusion welding step of welding the protrusion 3 to the outer shell 1 in a state where the protrusion 3 protrudes outward from the back portion of the tubular portion 4; a bracket position changing step of rotating the bracket B in the circumferential direction to allow the protrusion 3 to protrude outwardly from the side portion of the tubular portion 4; and a bracket welding step of welding the tubular portion 4 to the outer shell 1, in this order.

According to the above method, since the protrusion 3 can be set to protrude outward from the side portion of the tubular portion 4 in a state where the bracket B is welded to the outer shell 1, it is possible to avoid interference between the protrusion 3 and peripheral components. Moreover, even when the protrusion 3 is set to protrude outward from the side portion of the tubular portion 4 in a state where the bracket B is welded to the outer shell 1, it is possible to direct the mounting portions 5 and 6 to the opposite side of the protrusion 3 at the time of welding the protrusion 3 before welding the bracket B. With this configuration, it is possible to facilitate the welding work of the protrusion 3 including a case where the welding is performed automatically by setting it on the machine without being hindered by the mounting portions 5 or 6 when the protrusion 3 is welded.

Furthermore, the damper A is formed such that the protrusion 3 is provided at the lower portion of the outer shell 1 as illustrated in FIG. 1. Accordingly, only the upper side edge 8b of the back opening 82 is curved so as to protrude upward, and the lower edge 8c is linearly extended from the edge of the side opening 80, 81 in a state where the bracket B is expanded (FIG. 6). In the protrusion welding step, the protrusion 3 is welded at a position lower than the position of the bracket B in the welded state (portion (a) of FIG. 7A). In the bracket position changing step, the bracket B is rotated in the circumferential direction while being shifted upward in the axial direction (arrows Y1 and Y2 in portions (c) and (d) of FIG. 7B).

According to the above configuration, even when the vertical width of the back opening 82 is made sufficiently large so as not to interfere with the torch, it is possible to prevent a case where the vertical width of the lower portion of the hole 8 in the tubular portion 4 becomes narrow to excessively weaken the rigidity of the portion. Note that the shape of the hole 8 can be appropriately altered as long as the rigidity of the bracket B is ensured. Depending on the shape of the hole 8 and the position of the protrusion 3, it would be possible to change the direction of moving the bracket B in the axial direction in the bracket position changing step, or stop moving the bracket B in the axial direction.

For example, in a case where the protrusion 3 is positioned in an upper portion in the axial direction of the bracket B in a state where the bracket B is fixed to the outer shell 1 by welding or the like, it is allowable to vertically reverse the shape of the hole 8 so as to reverse the direction of shifting the bracket B from the direction of the arrow Y1. Further, in a case where the protrusion 3 is located at a center portion in the axial direction of the bracket B in a state where the bracket B is fixed to the outer shell 1 by welding or the like, it is possible to arrange the side openings 80 and 81 at a center portion in the axial direction of the tubular portion 4. In such a case, the hole 8 may be formed to allow the back opening 82 to enlarge vertically. This can eliminate a need to move the bracket B in the axial direction in the bracket position changing step.

In addition, in the damper A, the shape of the bracket B is bilaterally symmetrical, and the shape of the hole 8 is bilaterally symmetrical. The term "bilaterally symmetrical" means that the shape of the hole is bilaterally symmetrical with respect to the above-described axis X in a state where the tubular portion 4 is disposed to set the axis X passing through the center of the tubular portion 4 to extend in the vertical direction and in a state where the front portion of the tubular portion 4 faces the front. In addition, the bilaterally symmetric shape need not to be strictly symmetrical, and may include manufacturing error.

With the use of the above configuration, it is possible to facilitate molding of the bracket B. More specifically, the bracket B is formed by performing press working on a base metal being a single metal plate. In a case where this type of bracket is molded by press working, if the bracket has an asymmetrical shape, with a large opening formed only in the right half of the bracket to increase the difference in rigidity between right and left, for example, there might be a case where the side with a lower rigidity would be deformed at the time of molding, resulting in displacement of the pair of mounting portions in the backward direction in some cases. In a case where the mounting portion is displaced in this manner, it would be necessary to perform correction of the mounting portion, adjusting the molding conditions, or the like, making it difficult to mold the bracket. That is, in molding the bracket B, it is preferable that the shape of the hole 8 is bilaterally symmetrical so as to reduce the difference in rigidity between the left and the right of the bracket B, and more preferably the shape of the bracket B itself is bilaterally symmetrical.

Note that the shapes of the bracket B and the hole 8 may be bilaterally asymmetric as long as the bracket B can be molded. Specifically, in a case where the protrusion 3 is to be inserted through the right side opening 81 in a state where the bracket B is welded like the damper A, the left side opening 80 can be eliminated. On the contrary, in a case where the protrusion 3 is to be inserted through the left side opening 80 in a state where the bracket B is welded, the right side opening 81 can be eliminated.

Furthermore, the damper A has a configuration in which the axial length of the back opening (portion located at the back portion of the tubular portion 4 in the hole 8) 82 is longer than the axial length of the side opening (portion located on the side portion of the tubular portion 4 in the hole 8) 80 and 81. Therefore, it is possible, in the protrusion welding step, to sufficiently separate the distance from the protrusion 3 to the edge of the hole 8, further facilitating welding operation. Furthermore, even with a sufficient distance from the protrusion 3 to the edge of the hole 8, the axial length of the side opening 80 and 81 is short, making it easy to ensure the rigidity of the bracket B. In addition, as long as the rigidity of the bracket B can be ensured while preventing the interference between the edge of the hole 8 and the torch, the axial length of the hole 8 from the side portion to the back portion may be set to a constant length.

In addition, in the damper A, the hole 8 is formed to a position facing the slit 4a in the diametrical direction (FIG. 4), making it possible to set the protrusion 3 to protrude outward from the center position in the circumferential direction on the back portion of the tubular portion 4 (portion (b) of FIG. 7A). In this case, in the protrusion welding step, an angle $\theta$ formed by a line segment passing through the center of the protrusion 3 and a line segment extending in the diametrical direction of the tubular portion 4 and passing through the centers of the pair of mounting portions 5 and 6 (hereinafter, referred to as the angle $\theta$ of the mounting portions 5 and 6 with respect to the protrusion 3) is about 180 degrees (portion (b) of FIG. 7A). In this case, since both the mounting portions 5 6 are separated from the protrusion 3, it is possible to reliably prevent the mounting portions 5 and 6 from hindering the welding operation. Furthermore, since welding can be performed in a state where the outer periphery of the outer shell 1 exposed from the slit 4a is directly supported while the protrusion 3 is pressed against the outer shell 1, welding accuracy can be improved.

Note that the hole 8 only has to be formed so as to extend from at least one side portion of the tubular portion 4 to the back portion so that the protrusion portion 3 can be moved from the side opening (80 or 81) to the back opening 82 in a state where the protrusion portion 3 is inserted through the hole 8. That is, the angle θ of the mounting portions 5 and 6 with respect to the protrusion 3 may be less than 180 degrees, and the hole 8 need not necessarily reach the position where the hole 8 faces the slit 4a in the diametrical direction. However, in the case of the latter case, for example, in a case where the opposite side of the protrusion 3 in the diametrical direction in the outer shell 1 is covered with the bracket, the outer shell may be supported via the bracket. Still, the dimensions of the bracket include manufacturing errors, making it difficult to accurately grasp the axis of the outer shell.

The damper (cylinder device) A includes the tubular outer shell 1, the protrusion 3 provided on the side portion of the outer shell 1 and protruding outward in the radial direction, and the bracket B attached to the outer periphery of the outer shell 1. The bracket B includes: the tubular portion 4 having a C-shaped cross section and holding the outer periphery of the outer shell 1 and having a slit 4a in the front portion; and the pair of mounting portions 5 and 6 protruding outward in the radial direction from both ends in the circumferential direction of the tubular portion 4. Additionally, the hole 8 is formed in the tubular portion 4 so as to allow insertion of the protrusion 3 from both side portions to the back portion.

According to the above configuration, the protrusion 3 can protrude outward from the side portion of the tubular portion 4 or protrude outward from the back portion while the protrusion 3 is inserted through the hole 8. Therefore, at the time of welding the bracket B, the protrusion 3 protrudes from the side portion of the tubular portion 4 so as to avoid interference between the protrusion 3 and the peripheral components.

Even when the protrusion 3 is set to protrude from the side portion of the tubular portion 4 in a state where the bracket B is welded to the outer shell 1 in this manner, the hole 8 is formed up to the back portion of the tubular portion 4 so as to enable directing the mounting portions 5 and 6 to the opposite side of the protrusion 3 in a state before the bracket B is welded. Accordingly, by welding the protrusion 3 to the outer shell 1 in such a state, it is possible to facilitate the welding work of the protrusion 3 including a case where the welding is performed automatically by setting it on the machine without being hindered by the mounting portions 5 or 6 at the time of welding.

Furthermore, since the hole 8 is formed from both side portions of the tubular portion 4 to the back portion, in a case where the damper A is used for the vehicle, a bracket can be shared in use by both the damper attached to the left wheel and the damper attached to the right wheel, among the pair of wheels on the left and right. This makes it possible to reduce the types of components of the vehicle, and to prevent occurrence of wrong assembly of the bracket, such as attaching the right side bracket to the left side damper.

As described above, the hole 8 only has to be formed from at least one side portion to the back portion of the tubular portion 4, and it is not always necessary to form the hole 8 from both side portions of the tubular portion 4 to the back portion.

In the damper A, the angle θ of the mounting portions 5 and 6 with respect to the protrusion 3 is about 90 degrees in a state where the bracket B is welded to the outer shell 1 (portion (d) of FIG. 7B). While the angle θ can be appropriately changed, in a case where the cylinder device such as the damper A is used for a strut suspension and in view of avoiding interference with peripheral components in the vehicle, it would be preferable that the angle θ is about 90±5 degrees.

Furthermore, while the present embodiment is a case where the bracket B is formed by pressing a sheet-like base material and thus has a single plate structure, the bracket B may include an inner bracket having U-shaped cross section between the pair of mounting portions 5 and 6 so as to have a double plate structure.

Furthermore, in the present embodiment, the protrusion 3 is a part of the damping force variable valve V. In the case of including the damping force adjusting portion such as the damping force variable valve V in the damper A, it is necessary to draw the liquid into the damping force adjusting portion. Therefore, when the protrusion is disposed at a position overlapping with the bracket, it is necessary to form a hole in the bracket and directly weld the protrusion to the outer shell through the hole, and this would require high accuracy. Therefore, in a case where the protrusion is the damping force adjusting portion, application of the present invention is particularly effective. The protrusion 3, however, may have a configuration other than the damping force adjusting portion.

Furthermore, in the present embodiment, the cylinder device is the damper A and exerts a damping force by giving resistance to the flow of the liquid. Alternatively, the cylinder device may exert a damping force in another method (for example, electromagnetic force, frictional force, etc.) and may be implemented as an actuator that actively drives an object.

These modifications can be implemented irrespective of the shape of the hole 8 and the range in which the hole 8 is provided.

Although the preferred embodiments of the present invention have been described in detail, modifications, variations and alterations can be made without departing from the scope of the claims.

The invention claimed is:

1. A cylinder device comprising:
    a tubular outer shell;
    a protrusion provided on a side portion of the outer shell and protruding outward in a radial direction; and
    a bracket attached to an outer periphery of the outer shell,
    wherein the bracket includes: a tubular portion having a C-shaped cross section, holding the outer periphery of the outer shell, and having a slit at a front portion; and a pair of mounting portions protruding outward in the radial direction from both ends in a circumferential direction of the tubular portion,
    the tubular portion includes a hole being formed to permit insertion of the protrusion, from at least one side portion to a back portion of the tubular portion,
    the bracket is formed by a single metal plate,
    the hole includes a side opening located at a side portion of the tubular portion, and a back opening located at a back portion of the tubular portion,
    an axial length of the back opening is longer than an axial length of the side opening,
    the protrusion is housed in the side opening by rotating the bracket in a circumferential direction with respect to the outer shell, after the protrusion is welded to the outer shell in a state where the protrusion is arranged in the back opening of the bracket, and the bracket is attached to the outer shell in a state where the protrusion is housed in the side opening.

2. The cylinder device according to claim 1, wherein the hole includes a portion that faces the slit in a diametrical direction of the tubular portion.

3. The cylinder device according to claim 1, wherein an axial length of a portion of the hole, located at a back portion of the tubular portion, is longer than an axial length of a portion of the hole, located at a side portion of the tubular portion.

4. The cylinder device according to claim 1, wherein a shape of the hole is axisymmetric with a center of the tubular portion in a circumferential direction as an axis of symmetry.

5. A method for manufacturing a cylinder device, the cylinder device including:

a tubular outer shell;

a protrusion provided on a side portion of the outer shell and protruding outward in a radial direction; and a bracket attached to an outer periphery of the outer shell, the bracket including:

a tubular portion having a C-shaped cross section, holding the outer periphery of the outer shell, having a slit at a front portion, and including a hole being formed to permit insertion of the protrusion from at least one side portion to a back portion of the tubular portion; and a pair of mounting portions protruding outward in the radial direction from both ends in a circumferential direction of the tubular portion, the bracket is formed by a single metal plate, the hole includes a side opening located at a side portion of the tubular portion, and back opening located at a back portion of the tubular portion, an axial length of the back opening is longer than an axial length of the side opening, the method comprising executing, in order:

a protrusion welding step of rotatably attaching the bracket to the outer periphery of the outer shell, and welding the protrusion to the outer shell in a state where the protrusion protrudes outward from the back opening of the hole;

a bracket position changing step of rotating the bracket in a circumferential direction and setting the protrusion to protrude outward from the side opening of the hole; and a bracket welding step of welding the tubular portion to the outer shell.

* * * * *